United States Patent
Mor et al.

(10) Patent No.: US 12,379,862 B2
(45) Date of Patent: Aug. 5, 2025

(54) DEVICES, SYSTEM AND METHODS FOR OPTIMIZATION IN DEDUPLICATION

(71) Applicant: Huawei Technologies Co., Ltd., Shenzhen (CN)

(72) Inventors: Yaron Mor, Hod Hasharon (IL); Assaf Natanzon, Hod Hasharon (IL); Aviv Kuvent, Hod Hasharon (IL); Asaf Yeger, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 17/805,053

(22) Filed: Jun. 2, 2022

(65) Prior Publication Data

US 2022/0291852 A1   Sep. 15, 2022

Related U.S. Application Data

(63) Continuation of application No. PCT/EP2019/083394, filed on Dec. 3, 2019.

(51) Int. Cl.
 *G06F 3/06* (2006.01)

(52) U.S. Cl.
 CPC ......... *G06F 3/0641* (2013.01); *G06F 3/0604* (2013.01); *G06F 3/0643* (2013.01); *G06F 3/0659* (2013.01); *G06F 3/067* (2013.01)

(58) Field of Classification Search
 None
 See application file for complete search history.

(56) References Cited

U.S. PATENT DOCUMENTS

| | | | |
|---|---|---|---|
| 8,402,250 B1* | 3/2013 | Juillard | G06F 16/1824 711/216 |
| 8,930,648 B1* | 1/2015 | Storer | G06F 3/0641 711/161 |
| 8,996,797 B1* | 3/2015 | Zheng | G06F 3/061 711/163 |
| 10,037,337 B1* | 7/2018 | Shanmuganathan | ... G06F 3/067 |
| 2011/0191305 A1* | 8/2011 | Nakamura | G06F 3/067 707/E17.005 |
| 2012/0158670 A1 | 6/2012 | Sharma et al. | |
| 2013/0086006 A1 | 4/2013 | Colgrove et al. | |
| 2013/0151756 A1 | 6/2013 | Tofano | |

(Continued)

FOREIGN PATENT DOCUMENTS

| | | |
|---|---|---|
| CN | 103136243 A | 6/2013 |
| CN | 103959256 A | 7/2014 |
| CN | 110401681 A | 11/2019 |

*Primary Examiner* — Arpan P. Savla
*Assistant Examiner* — Edmund H Kwong
(74) *Attorney, Agent, or Firm* — Slater Matsil, LLP (57) ABSTRACT

A method and a global server for deduplicating multiple storage servers are disclosed. The global server maintains information regarding a set of hash values, each hash value being associated with a data chunk of data stored in the global server and/or the storage servers, receive, from one or more of the storage servers, a request to modify the information with respect to one or more hash values, accumulate and sort metadata related to the one or more requests, modifies the information with respect to the one or more hash values, based on the accumulated metadata when the accumulated metadata reaches a determined size.

20 Claims, 7 Drawing Sheets

(56) References Cited

U.S. PATENT DOCUMENTS

| | | | |
|---|---|---|---|
| 2013/0262805 A1* | 10/2013 | Zheng | G06F 3/0683 |
| | | | 711/162 |
| 2013/0268498 A1 | 10/2013 | Sisco et al. | |
| 2015/0213049 A1 | 7/2015 | Kleiman et al. | |
| 2016/0154839 A1* | 6/2016 | Bezawada | G06F 21/645 |
| | | | 707/692 |
| 2017/0192712 A1 | 7/2017 | Kenkre et al. | |
| 2018/0253255 A1* | 9/2018 | Jain | G06F 3/0673 |

* cited by examiner

DEVICES, SYSTEM AND METHODS FOR OPTIMIZATION IN DEDUPLICATION

CROSS-REFERENCE TO RELATED APPLICATIONS

This application is a continuation of International Application No. PCT/EP2019/083394, filed on Dec. 3, 2019. The disclosure of the aforementioned application is hereby incorporated by reference in its entirety.

TECHNICAL FIELD

The present disclosure relates to a data storage deduplication method, in particular, to an optimized memory management method in a global deduplication server (GDS, may also be simply called as global server). The disclosure solves a performance degradation by optimizing the memory management in the GDS.

BACKGROUND

Data deduplication (also referred to as data optimization) refers to reducing the physical amount of bytes of data that need to be stored on disk or transmitted across a network, without compromising the fidelity or integrity of the original data, i.e., the reduction in bytes is lossless and the original data can be completely recovered. By reducing the storage resources to store and/or transmit data, data deduplication thus leads to savings in hardware costs (for storage and network transmission) and data-managements costs (e.g., backup). As the amount of digitally stored data grows, these cost savings become significant.

Data deduplication typically uses a combination of techniques to eliminate redundancy within and between persistently stored files. One technique operates to identify identical regions of data in one or multiple files, and physically storing only one unique region (referred to as chunk), while maintaining a pointer to that chunk in association with the file. Another technique is to mix data deduplication with compression, e.g., by storing compressed chunks.

Many organizations use dedicated servers to store data (i.e. storage servers). Data stored by different servers is often duplicated, resulting in space loss. A solution for this problem is deduplication, which includes storing only unique data up to a certain granularity, by using hashes to identify duplicates. However, deduplication is performed in the granularity of a specific single storage server.

To prevent duplication of data across multiple storage servers, a concept of deduplication of deduplication (nested deduplication), including an additional deduplication tier (performing deduplication of multiple deduplication servers) is introduced. In particular, a GDS is proposed, which will store highly-duplicated data, as a solution to the problem of performing deduplication across multiple storage servers.

The GDS stores hashes sent by the storage servers which comply with the nested deduplication (i.e. a storage servers cluster), to determine whether a hash value appears in enough storage servers to warrant having the GDS take ownership of the data represented by this hash value. The hash value can be used to uniquely identify a respective data chunk. Since the GDS stores all hash values of the storage servers in the storage servers cluster (regardless of whether it also stores their data), this results in a large storage space required to store all these hashes. Consequently, holding all hashes in memory of the GDS is not possible, which further affects the performance of the GDS, in particular when replying to requests to store or delete hash values.

The standard solution for such a problem is caching of data in memory. Due to the way the GDS architecture is constructed (multiple storage servers are formed as the storage servers cluster communicating with a single GDS), without a proper caching policy and method, this may result in many "cache-misses", which will force disk-access each time.

This disclosure aims to solve this performance degradation by optimizing the memory management efficiency of the GDS when the hash values are stored in the memory of the GDS.

SUMMARY

In view of the above-mentioned problems, embodiments of the present disclosure have the objective to provide a data management solution, which optimizes a response time of a global server. To this end, one goal is reducing cache misses of the global server. A further goal of the embodiments of the present disclosure is to allow reading hash values more from memory and less from disk. Another aim is to reduce I/O operations.

The objective is achieved by the embodiments provided in the enclosed independent claims. Advantageous implementations of the embodiments of the present disclosure are further defined in the dependent claims.

A first aspect of the disclosure provides a global server for deduplicating multiple storage servers, wherein the global server is configured to: receive, from one or more of the storage servers, a request to modify the information with respect to one or more hash values from a set of hash values, wherein the set of hash values is maintained, and each hash value is associated with a data chunk of data stored in the global server and/or the storage servers; accumulate and sort metadata related to the one or more requests, wherein the metadata comprises, for each request, a hash value indicated by the request and an indication of the storage server that sent the request; and when the accumulated metadata reaches a determined size, modify the information with respect to the one or more hash values, based on the accumulated metadata.

This disclosure provides a global server that stores highly-duplicated data in a nested deduplication system. The nested deduplication system may comprise a global server and multiple storage servers. In particular, this disclosure proposes a global server that stores the requested hash values (and the storage servers that requested them), and does not handle the requests immediately. In this way, the global server handles requests asynchronously and in a localized manner. As a consequence, cache misses in the global server are reduced, and thus a response time of the global server is optimized. In particular, a latency of the global sever can be reduced.

The term "global server" is an abbreviation of "global deduplication server", and refers to a server for handling the highly-duplicated data in a storage system comprising multiple deduplication servers. In the implementation, the GDS can be implemented as a centralized device (e.g., a server), or deployed in one storage server of the multiple storage servers, or implemented in a distributed manner.

In an implementation form of the first aspect, information regarding the set of hash values may be maintained in the global server or in a separate storage device accessible to the global server. This improves variety of implementation of the deduplication system.

In an implementation form of the first aspect, the global server comprises a memory, and the global server is configured to accumulate the metadata in the memory.

In particular, the global server may sort and collect the requested hash values in the memory.

In an implementation form of the first aspect, the global server further comprises a disk storage, and the global server is configured to dump the accumulated metadata to the disk storage in response to the accumulated metadata reaches the determined size.

Once the global server has accumulated a certain amount of hash values, it may dump these hash values to the disk storage.

In an implementation form of the first aspect, the global server is configured to: in response to the accumulated metadata reaches the determined size, fill the metadata into a first block of a plurality of blocks, wherein each block comprises the same number of chunks, and each chunk is filled with metadata related to one or more requests; dump the first block to the disk storage; and in response to a number of blocks dumped to the disk storage exceeds a determined threshold, modify the information with respect to the one or more hash values, based on the accumulated metadata in the number of blocks.

When enough requests have already been dumped to the disk storage, the global server may start dealing with the requests.

In an implementation form of the first aspect, the information comprises a hash metadata table including the set of hash values, the hash metadata table being stored in the disk storage.

A table storing hash values and information related to respective hash values, namely the hash metadata table, may thus be stored in the local disk of the global server.

In an implementation form of the first aspect, the global server is configured to: divide the hash metadata table into N parts, N being a positive integer no less than 2, wherein each part of the hash metadata table is associated with a different range of the hash values; upload a first part of the hash metadata table to the memory, wherein the first part of the hash metadata table is associated with a first range of hash values; and modify the first part of the hash metadata table based on the accumulated metadata in the number of blocks.

It should be noted that, the hash metadata table is a sorted table, where all hash values are stored in order. For instance, the hash values may be stored in ascending order or in descending order in the table. The range of hash values is divided into N parts, since the hash metadata table is divided into N parts. The global server will go over all parts one by one. The global server handles requests related to hash values which are contained in a respective part. Notably, the respective part is a part that is currently uploaded in the memory. Thus, the global server is able to read more from memory and less from disk.

In an implementation form of the first aspect, the global server is configured to: upload a first chunk, of each block dumped to the disk storage, to the memory; iterate over the hash values included in the metadata in all uploaded first chunks; merge the hash values that fall into the first range of hash values; and modify the first part of the hash metadata table stored in the memory, based on the metadata related to the merged hash values that fall into the first range of hash values.

In this way, the global server can perform a merging of the different accumulated blocks into the hash metadata table. This allows the global server to handle requests asynchronously and in a localized manner for the relevant hash values (that fall into a specific range of hash values). The algorithm is basically a merge sort algorithm, allowing sequential access to the disk in order to sort.

In an implementation form of the first aspect, the hash metadata table comprises information about each hash value in the set of hash values and information regarding one or more storage servers being registered for that hash value.

The embodiments of this disclosure are based on a fact that when a storage server requests the global server to add a hash value, the global server will register that storage server for that hash value.

In an implementation form of the first aspect, the global server is configured to do the following.

In response to a metadata, which is related to a first hash value falling into the first range of hash values, comprising a request to add the first hash value: in response to the first hash value not being included in the first part of the hash metadata table, add the first hash value into the first part of the hash metadata table, create a first water mark associated with the first hash value, and register the storage server that sent the request regarding the first hash value, wherein the first water mark indicating whether a data chunk having the first hash value is highly duplicated among the storage servers; and in response to the first hash value is included in the first part of the hash metadata table, increase a value of the first water mark associated with the first hash value, and register the storage server that sent the request regarding the first hash value; and/or In response to a metadata, which is related to a second hash value falling into the first range of hash values, comprises a request to delete the second hash value: decrease a value of a second water mark associated with the second hash value, and unregister the storage server that sent the request regarding the second hash value, wherein the second water mark indicating whether a data chunk having the second hash value is highly duplicated among the storage servers; and in response to the value of the second water mark is equal to 0, delete the second hash value from the first part of the hash metadata table.

Generally speaking, the global server may create or increase a water mark associated with a hash value, upon receiving a request to add that hash value, and may register the storage server, which sent the request, for that hash value. Accordingly, the global server may decrease a value of a water mark associated with a hash value of a data when receiving a request from a storage server to remove the data, and may unregister the storage server for that hash value. Notably, according to embodiments of the present disclosure, the global sever may only handle the requests currently uploaded in the memory and the related hash values should fall into a specific range that is also in the memory during the same time period.

In an implementation form of the first aspect, the global server is configured to: after merging the hash values included in the metadata in a first chunk of a respective block, which fall into the first range of hash values, upload a second chunk, of that block, to the memory; iterate over the hash values included in the metadata in the uploaded second chunk; merge the hash values that fall into the first range of hash values; and modify the first part of the hash metadata table stored in the memory, based on the metadata related to the merged hash values that fall into the first range of hash values.

It should also be noted that, each chunk that is iterated to the end should be followed by uploading the next chunk. This is not related to the other chunks from other blocks.

In an implementation form of the first aspect, the global server is configured to: if a hash value that does not fall into the first range of hash values is found in a chunk of a block, stop iterating over the hash values included in the metadata in that chunk.

Since the metadata filled in all chunks are internally sorted, it allows efficiently identifying when to stop iterating over the hash values in a chunk.

In an implementation form of the first aspect, the global server is configured to: after iterating over the hash values included in the metadata in all uploaded chunks of each block dumped to the disk storage, which fall into the first range of hash values, persist the modified first part of the hash metadata table to the disk storage; upload a second part of the hash metadata table to the memory, wherein the second part of the hash metadata table is associated with a second range of hash values; and modify the second part of the hash metadata table based on the accumulated metadata in the number of blocks.

In particular, after uploading a part of the hash metadata table to the memory, all requests included in the metadata in all uploaded chunks of each block dumped to the disk storage should be processed by the global server. That is, before persisting the updated part to the disk storage, the global server needs to deal with each request regarding to add/delete a hash value, and to act according to each request (to modify the uploaded part of the hash metadata table).

After updating a respective part of the hash metadata table, which is currently in the memory of the global server, this part of the hash metadata table will be persisted back to the disk storage of the global server. That is, the updated part overwrites the old data of the same part. Then the global server starts to handle the next part of the hash metadata table.

A second aspect of the present disclosure provides a system for deduplicating multiple storage servers, comprising a global server according to the first aspect and its implementations, and multiple storage servers being configured to send a request to modify information with respect to one or more hash values.

In this topology, multiple storage servers may be connected to the global server. Each storage server may operate in a similar way. The storage server supports the global server in reducing cache misses, and thus a response time of a global server can be optimized. In particular, a latency of the global sever can be reduced.

A third aspect of the present disclosure provides a method performed by a global server, wherein the method comprises: receiving, from one or more of the storage servers, a request to modify the information with respect to one or more hash values from a set of hash values, wherein the set of hash values is maintained, and each hash value is associated with a data chunk of data stored in the global server and/or the storage servers; accumulating and sorting metadata related to the one or more requests, wherein the metadata comprises, for each request, a hash value indicated by the request and an indication of the storage server that sent the request; and in response to the accumulated metadata reaches a determined size, modifying the information with respect to the one or more hash values, based on the accumulated metadata.

The method of the third aspect and its implementation forms provide the same advantages and effects as described above for the global server of the first aspect and its respective implementation forms.

A fourth aspect of the present disclosure provides a computer program product comprising computer readable code instructions which, when run in a computer will cause the computer to perform a method according to the first aspect and its implementation forms.

A fifth aspect of the present disclosure provides a computer readable storage medium comprising computer program code instructions, being executable by a computer, for performing a method according to the first aspect and its implementation forms when the computer program code instructions runs on a computer. The computer readable storage medium is comprises of one or more from the group: ROM (Read-Only Memory), PROM (Programmable ROM), EPROM (Erasable PROM), Flash memory, EEPROM (Electrically EPROM) and hard disk drive.

A sixth aspect of the present disclosure provides a global server for deduplicating multiple storage servers, includes a processor and a memory. The memory is storing instructions that cause the processor to perform the method according to the third aspect and its implementation forms.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTION OF ILLUSTRATIVE EMBODIMENTS

Illustrative embodiments of method, device, and program product for efficient packet transmission in a communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
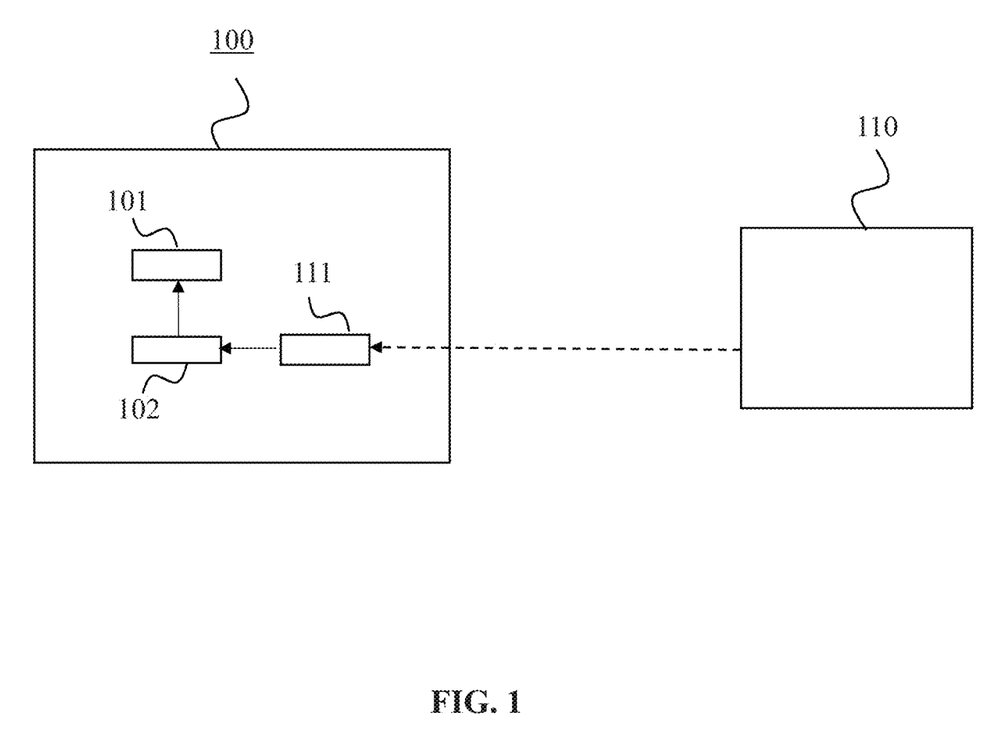
FIG. 1 shows a global server according to an embodiment of the disclosure.

FIG. 1 shows a global server 100 according to an embodiment of the disclosure. The global server 100 may comprise processing circuitry (not shown) configured to perform, conduct or initiate the various operations of the global server 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the global server 100 to perform, conduct or initiate the operations or methods described herein.

The global server 100 is adapted for deduplicating multiple storage servers 110 (one of which is illustrated). The global server 100 may be configured to maintain information 101 regarding a set of hash values, each hash value being associated with a data chunk of data stored in the global server 100 and/or the storage servers 110. The global server 100 is further configured to receive, from one or more of the storage servers 110, a request 111 to modify the information 101 with respect to one or more hash values. Then, the global server 100 is configured to accumulate and sort metadata related to the one or more requests 111, wherein the metadata comprises, for each request 111, a hash value indicated by the request and an indication of the storage server that sent the request. Further, when the accumulated metadata 102 reaches a determined size, the global server 100 is configured to modify the information 101 with respect to the one or more hash values, based on the accumulated metadata 102.

For the skilled person in the storage field, the information regarding a set of hash values can also be maintained in a separate device (e.g., a storage server) accessible to the global server 100. The above description of the global server cannot be treated as a limitation to the implementation of the global server 100.

Figure 2:
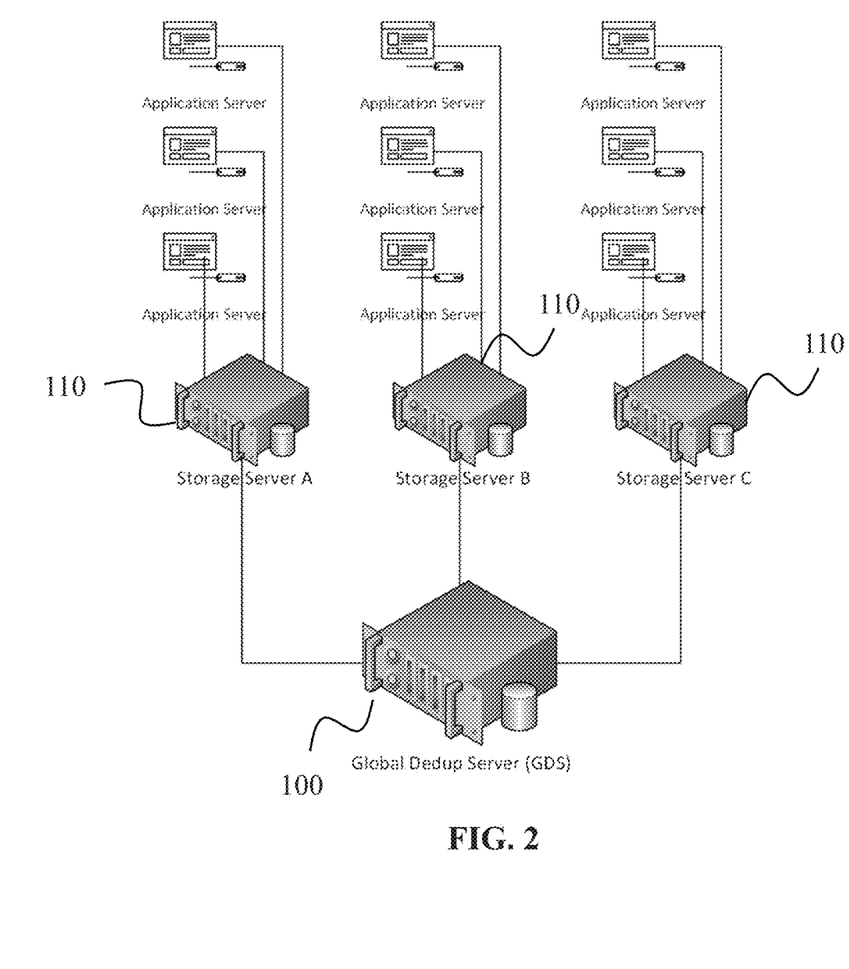
FIG. 2 shows a topology according to an embodiment of the disclosure.

The embodiments of this disclosure apply to nested deduplication topologies. FIG. 2 shows a topology of a global server 100 and storage servers A, B and C, according to an embodiment of the disclosure. Notably, an actual number of storage servers in implementations of a nested deduplication topology is not limited herein. The global server 100 provides an additional deduplication tier. That is, a deduplication of multiple deduplication servers (i.e. storage servers) is performed. Typically, a number of application servers have access to the respective storage server. A user could write/read data to the storage server through the application server.

A hash value of a data chunk can be obtained by performing a hash function or hash algorithm on the data chunk. The hash value can be used to uniquely identify respective data chunk. This disclosure does not limit the types of hashing and chunking techniques used in the storage servers, as long as it is identical across all servers. When a user writes data to the storage server 110, the storage server 110 may perform chunking and hashing of the data, to obtain a hash value of the data chunk. Since data stored by multiple deduplication servers or storage servers is often duplicated, to avoid a space loss, the storage server may request to store some data in a GDS.

In particular, the GDS shown in FIG. 2 is the global server 100 according to an embodiment of the disclosure, as shown in FIG. 1. Each of the storage servers A, B and C shown in FIG. 2 is the storage server 110 according to an embodiment of the disclosure, as shown in FIG. 1. The global server 100 aims to store the highly-duplicated data of the storage servers 110. Generally, the determination of a highly-duplicated data is done by the global server 100, according to some configurable thresholds. The storage servers 110 communicate with the global server 100 and send requests to store data, which the global server 100 may accept or reject according to the configured thresholds. The highly-duplicated data may be stored in the global server 100. Accordingly, the storage servers 110 may remove the highly-duplicated data from their local storage and reply on the global server 100. In some scenarios, the storage servers may also keep a copy of the highly-duplicated data.

When a storage server 110 sends a request to store or remove a data, the storage server 110 sends a hash value associated with that data to the global server 100. Accordingly, the global server will record the hash value related to the request and the storage server 110 that sent the request. Such information is recorded as a metadata related to the request. When a plurality of requests are received by the global server 100, a plurality of metadata related to the plurality of requests will be recorded. According to the embodiments of this disclosure, metadata related to the received requests will be collected and sorted, in a particular order. For instance, the metadata may be sorted in ascending or descending order, particularly according to hash values comprised in the metadata.

This disclosure proposes to optimize a memory management of the hash values stored in the GDS. In this solution, the GDS will delay its responses to the requests received from storage servers. That is, the GDS handles the received requests only when a number of the requests reaches a threshold, i.e., in an asynchronous manner.

Figure 3:
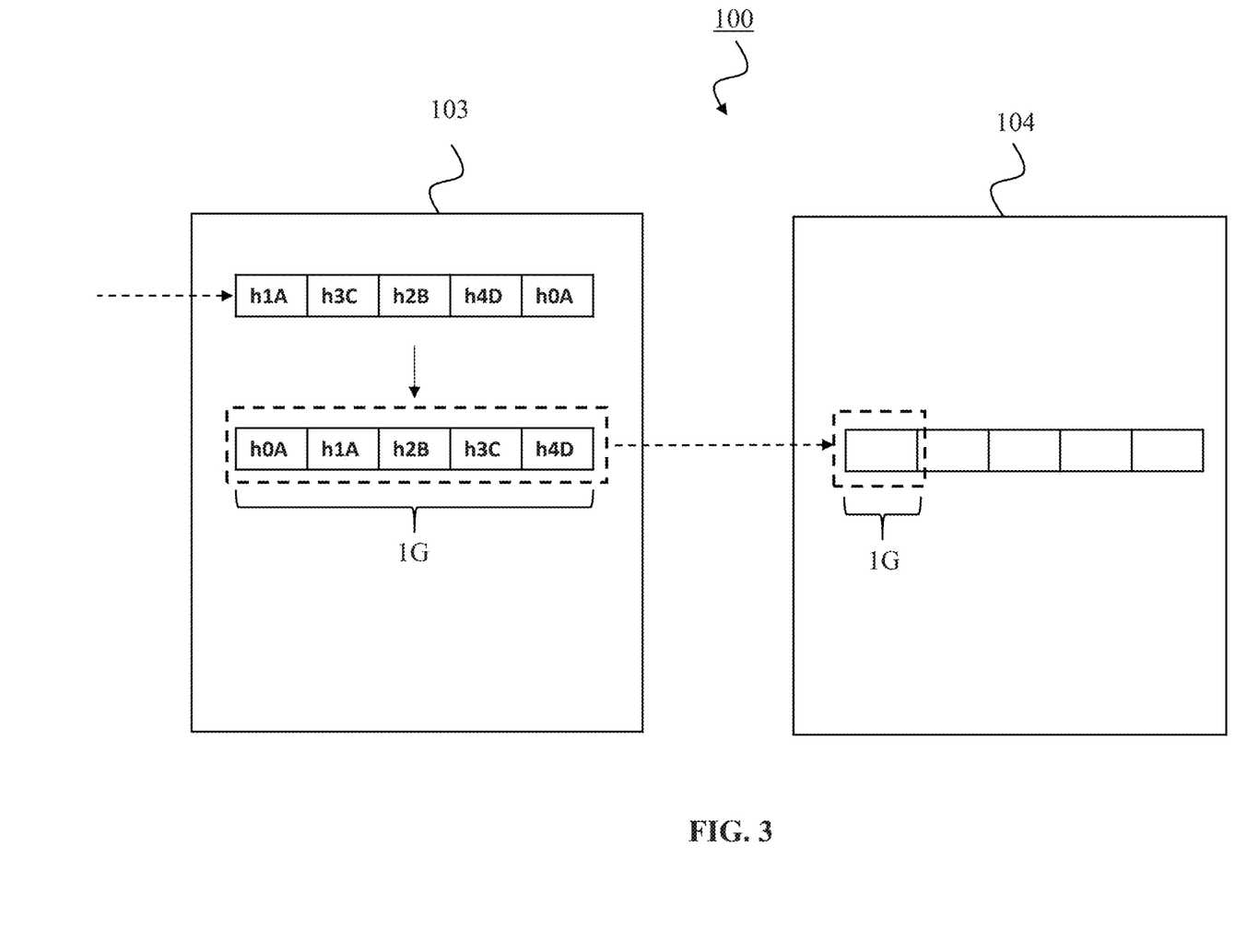
FIG. 3 shows data storage in a global server according to an embodiment of the disclosure.

Notably, the global server 100 may comprise a memory 103, as shown in FIG. 3. Optionally, the global server 100 may be further configured to accumulate the metadata 102 in the memory 103. After receiving the requests from the storage servers 110, the global server 100 will immediately acknowledge that it receives the hash values, but it will not request the storage servers 110 to send the data. The hash values associated with the requests, and the storage servers that sent the requests, will be sorted and collected in the memory 103. As the embodiment depicted in FIG. 3, the metadata related to the one or more request 111, comprising the hash values indicated by the requests and indications of the storage servers 110 that sent the requests, are sorted in ascending order.

Notably, the global server 100 may further comprise a disk storage 104, as shown in FIG. 3. Optionally, the global server 100 may be further configured to dump the accumulated metadata 102 to the disk storage 104 when the accumulated metadata 102 reaches the determined size.

For instance, once the global server 100 has accumulated X bytes of metadata, X being a positive integer, or a block of metadata, e.g. 1 GB, according to the embodiment shown in FIG. 3, the global server 100 will dump these metadata, i.e., X bytes or the block of hash values, to the disk storage

104. The value of X or the size of the block may be determined according to specific circumstances.

Further, the global server 100 may be configured to fill the metadata into a first block of a plurality of blocks when the accumulated metadata 102 reaches the determined size, wherein each block comprises the same number of chunks, and each chunk is filled with metadata related to one or more requests. Notably, one block consists a number of chunks. The accumulated metadata 102 are being filled into blocks, and particularly in a manner that being evenly distributed in chunks of each block. The global server 100 may be further configured to dump the first block to the disk storage 104. Accordingly, when a number of blocks dumped to the disk storage 104 exceeds a determined threshold, the global server 100 may be configured to modify the information 101 with respect to the one or more hash values, based on the accumulated metadata 102 in the plurality of blocks. That is, only when enough requests already dumped to the disk storage 104 (e.g., 50 GB), the global server 100 will handle the requests. In one example, given that each block is filled with 1 GB metadata related to requests, when 50 blocks have been dumped to the disk storage 104, the global server 100 starts to handle those requests.

Figure 4:
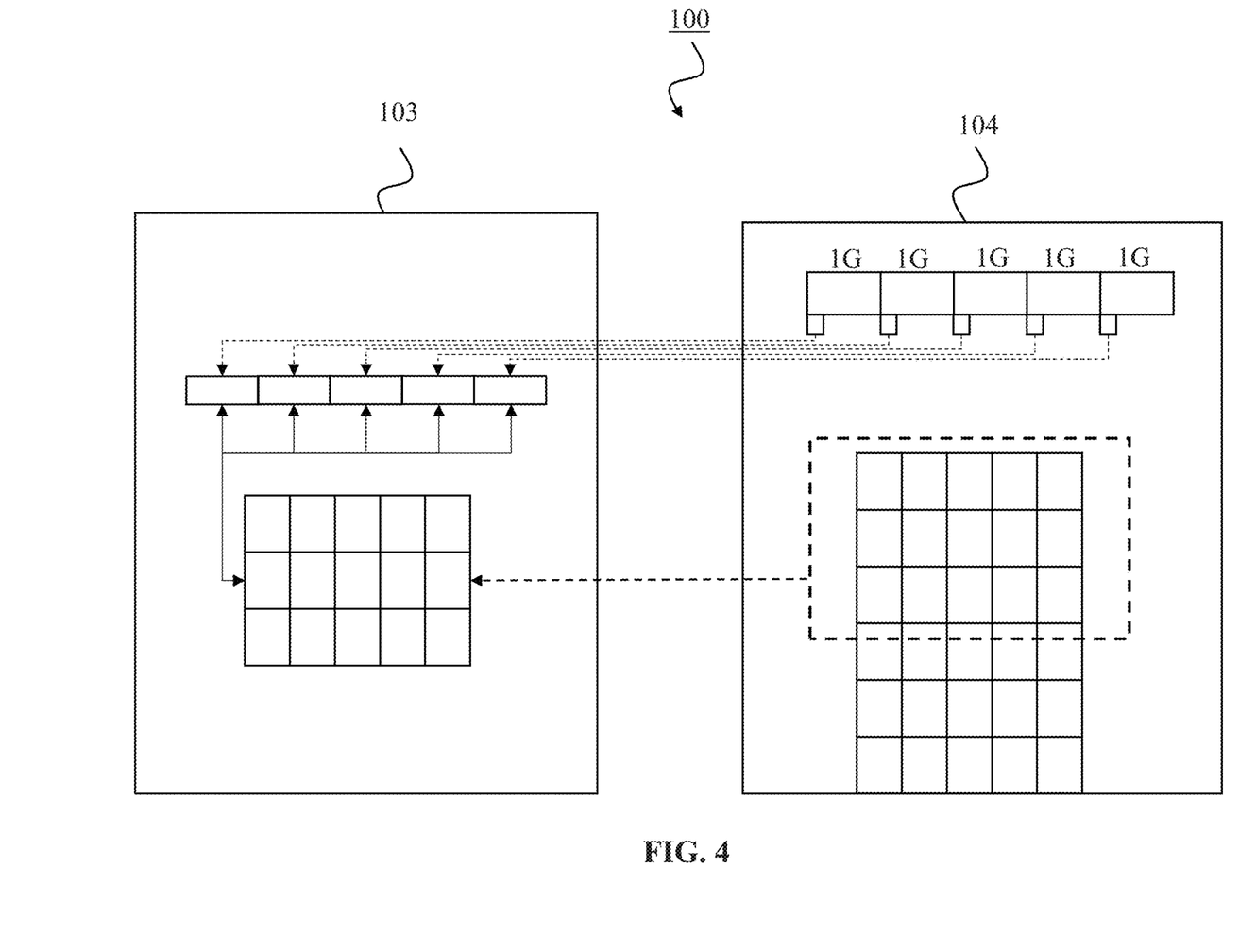
FIG. 4 shows data storage in a global server according to an embodiment of the disclosure.

Optionally, the information 101 maintained in the global server 100 may comprise a hash metadata table including the set of hash values, and the hash metadata table may be stored in the disk storage 104, as shown in FIG. 4. Notably, FIG. 4 depicts an embodiment of this disclosure based on the embodiment shown in FIG. 3.

Accordingly, the global server 100 may be further configured to divide the hash metadata table into N parts, particularly N equal parts, where N being a positive integer no less than 2. Each part of the hash metadata table is associated with a different range of the hash values. In particular, the hash values are arranged in a specific order in the hash metadata table, e.g., in ascending or descending order. That is, if the hash values are arranged in ascending order, a hash value in Nth part of the hash metadata table will have a greater value than a hash value in (N−1)th part of the hash metadata table. The ranges of the hash values in respective parts of the hash metadata table will not overlap with each other.

Optionally, the global server 100 may be further configured to upload a first part of the hash metadata table to the memory 103, as shown in FIG. 4. In particular, the first part of the hash metadata table is associated with the first range of the hash values. Accordingly, the global server 100 may be configured to modify the first part of the hash metadata table based on the accumulated metadata 102 in the plurality of blocks.

Further, the global server 100 may be configured to upload a first chunk, of each block dumped to the disk storage 104, to the memory 103. As the embodiment shown in FIG. 4, each block in the disk storage 104 has a size of 1 GB, and the first chunk of each block is uploaded to the memory. The global server 100 may be further configured to iterate over the hash values included in the metadata 102 in all uploaded first chunks, and merge the hash values that fall into the first range of hash values. In particular, the first range corresponds the part of the hash metadata table that is currently in the memory 103. Then, the global server 100 may be further configured to modify the first part of the hash metadata table stored in the memory 103, based on the metadata 102 related to the merged hash values that fall into the first range of hash values.

In particular, the hash metadata table comprises information about each hash value in the set of hash values and information regarding one or more storage servers 110 being registered for that hash value. For example, for each hash value, a data chunk having that hash value, a water mark associated with that hash value, and information about which storage servers 110 that have requested to add that hash value, may be included in the hash metadata table.

Possibly, in an embodiment of this disclosure, a request received from a storage server 110 may comprise a request to add a first hash value. Accordingly, a metadata related to the first hash value comprises a request to add the first hash value. If the first hash value falls into the first range of hash values, when the first hash value is not included in the first part of the hash metadata table, the global server 100 may be configured to add the first hash value into the first part of the hash metadata table, create a first water mark associated with the first hash value, and register the storage server 110 that sent the request regarding the first hash value. The first water mark indicates whether a data chunk having the first hash value is highly duplicated among the storage servers 110. For instance, if the first water mark has a value of 1, that means, there is one storage server 110 that requests to add the first hash value. It should be noted that, when the first hash value is not included in the first part of the hash metadata table, means that although the first hash value falls into the first range, it is currently not been stored in the global server 100. When the first hash value is included in the first part of the hash metadata table, the global server 100 may be configured to increase a value of the first water mark associated with the first hash value, and register the storage server 110 that sent the request regarding the first hash value.

Possibly, in another embodiment of this disclosure, a request received from a storage server 110 may comprise a request to delete a second hash value. Accordingly, a metadata related to the second hash value comprises a request to add the second hash value. Similarly, if the second hash value falls into the first range of hash values, the global server 100 may be configured to decrease a value of a second water mark associated with the second hash value, and unregister the storage server 110 that sent the request regarding the second hash value. Similarly, the second water mark indicates whether a data chunk having the second hash value is highly duplicated among the storage servers 110. In addition, when the value of the second water mark is equal to 0, the global server 100 may be configured to delete the second hash value from the first part of the hash metadata table. It should be noted that, when the value of the second water mark is equal to 0, means that currently there is no storage server 110 still requests to add the second hash value, thereby it can be deleted from the hash metadata table.

Notably, while merging the hash values that fall into the first range of hash values, the global server 100 may insert the hash values into, or deletes the hash values from the first part of the hash metadata table that is currently in the memory 103. Based on whether the water mark associated with a respective hash value is above/below some thresholds, the global server 100 will either request to receive the data for that hash value from some storage server 110, or will decide to evacuate the data of that hash value and will notify all the relevant storage servers 110 to re-claim ownership of this data.

In particular, after merging the hash values included in the metadata in a first chunk of a respective block, which fall into the first range of hash values, the global server 100 is further configured to upload a second chunk, of that block, to the memory 103. The global server 100 is further configured to iterate over the hash values included in the metadata in the uploaded second chunk. Accordingly, the global server 100 is configured to merge the hash values that fall into the first range of hash values. Then the global server 100 is further configured to modify the first part of the hash metadata table stored in the memory 103, based on the metadata related to the merged hash values that fall into the first range of hash values.

It should be noted that, since the chunks of the plurality of blocks are internally sorted, it can be efficiently identified when to stop iterating over the hash values in a chunk. In particular, if a hash value that does not fall into the first range of hash values is found in a chunk of a block, the global server 100 may be configured to stop iterating over the hash values included in the metadata in that chunk.

Figure 5:
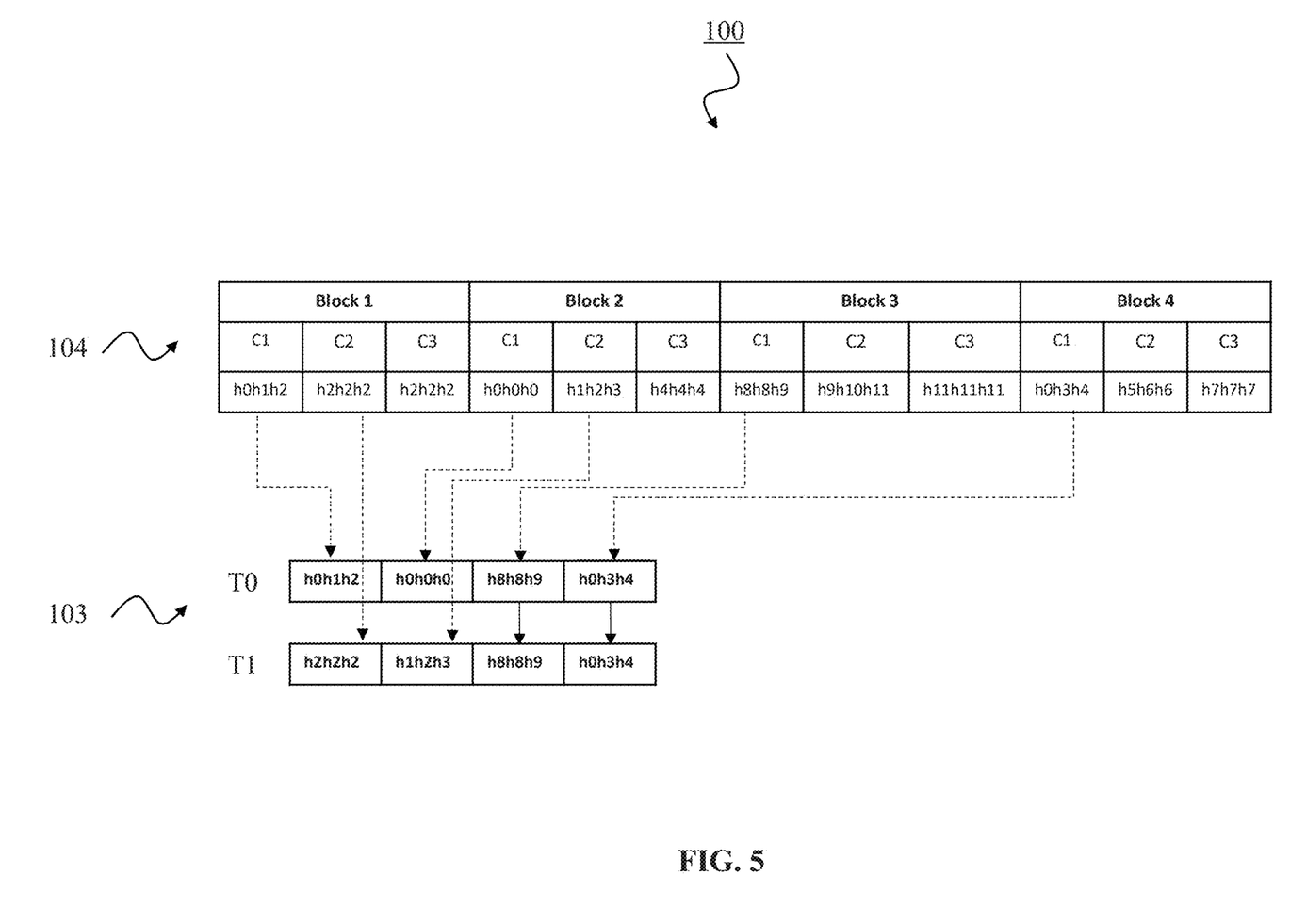
FIG. 5 shows data storage in a global server according to an embodiment of the disclosure.
Figure 6:
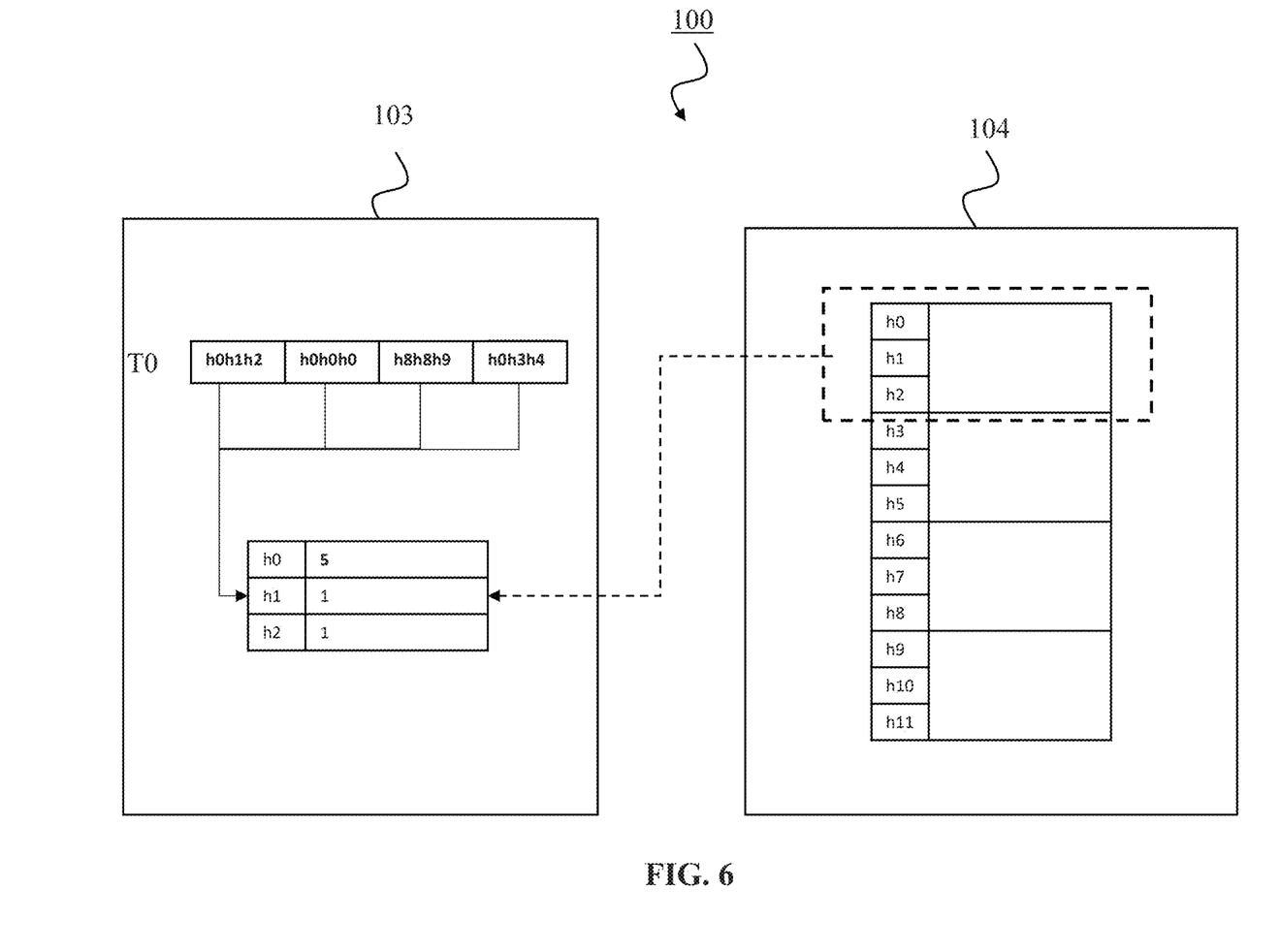
FIG. 6 shows data storage in a global server according to an embodiment of the disclosure.

On the other hand, it should also be noted that each chunk that is iterated to the end should be followed by uploading the next chunk. This is not related to the other chunks from other blocks. For example, it is possible that the first chunk from block A will not be iterated yet while the third chunk from block B will be uploaded. FIG. 5 and FIG. 6 show specific embodiments in this regard.

FIG. 5 and FIG. 6 are both based on embodiments shown in FIG. 3 and/or FIG. 4. FIG. 5 shows Block 1 to Block 4 that are in the disk storage 104 of the global server 100. Each block consists of three chunks, and each chunk is filled with metadata related to one or more requests received from the storage servers 110. Here a hash value indicated by a respective request is used to present the metadata related to that request. At a time point T0, the first chunk C1 of each block is uploaded into the memory 103 of the global server 100. Notably, before uploading the first chunks, the first part of the hash metadata table has been uploaded to the memory 103, as shown in FIG. 6. In this embodiment, the total hash range is from h0 to h11 (12 hashes) divided into 4 parts, the first part of the hash metadata table is associated with a first range of h0 to h2. Based on the first range of h0 to h2, the first chunks of Blocks 1 and 2 are iterated and merged to the end. In the following, the second chunks of Blocks 1 and 2 are uploaded accordingly, at a time point T1, as shown in FIG. 5. By contrast, the global server 100 stops iterating the first chunks of Blocks 3 and 4, once it spots the hash values h8 and h3, respectively. Therefore, the first chunk of Block 3 is not iterated as it belongs to the third and fourth parts of the hash metadata table, and only the first hash value of the first chunk of Block 4 is iterated. Notably, since each block (and each chunk) in the disk storage 104 is sorted, the rest of chunks in Blocks 3 and 4 will not be uploaded neither. Accordingly, at time T1, the second chunks of Blocks 1 and 2 are uploaded to the memory 103 and start being iterated.

Further, after iterating over the hash values included in the metadata in all uploaded chunks of each block dumped to the disk storage 104, which fall into the first range of hash values, the global server 100 may be configured to persist the modified first part of the hash metadata table to the disk storage 104. That is, the updated data overwrites the old data of the same part accordingly. Then the global server 100 may be further configured to upload a second part of the hash metadata table to the memory 103, wherein the second part of the hash metadata table is associated with a second range of hash values. Accordingly, the global server 100 may be configured to modify the second part of the hash metadata table based on the accumulated metadata 102 in the number of blocks.

The global server 100 will go over each part of the hash metadata table one by one. Namely, after the first part of the hash metadata table in the disk storage 104 is updated, the global server 100 will continue the procedure to update a second part of the hash metadata table. After the second part of the hash metadata table in the disk storage 104 is updated, the global server 100 will continue the procedure to update a third part of the hash metadata table, and so on.

It should be understood that, according to embodiments of this disclosure, such procedure may be performed every X minutes/hours/days, X being a positive number that can be configurable or changed dynamically. In this way, the global server 100 sorts and stores the hash values, and further handles them by order asynchronously. Thus, the global server 100 does not need to continuously access the disk storage 104 to retrieve and update hash values, rather it can process only the part of hash values in the memory 103. That is, the global server 100 only needs access the disk storage 104 once or twice during processing one of the parts.

By having the global server 100 delay its responses to the storage servers 110 and process the hash values offline, the global server 100 performs what is equivalent to a merge sort algorithm in order to update the primary hash table stored in it. Thereby, it is ensured to handle sequences of hash values which are in the memory. This further avoids cache-misses. In this way, a memory management in the global server 100 is optimized.

Figure 7:
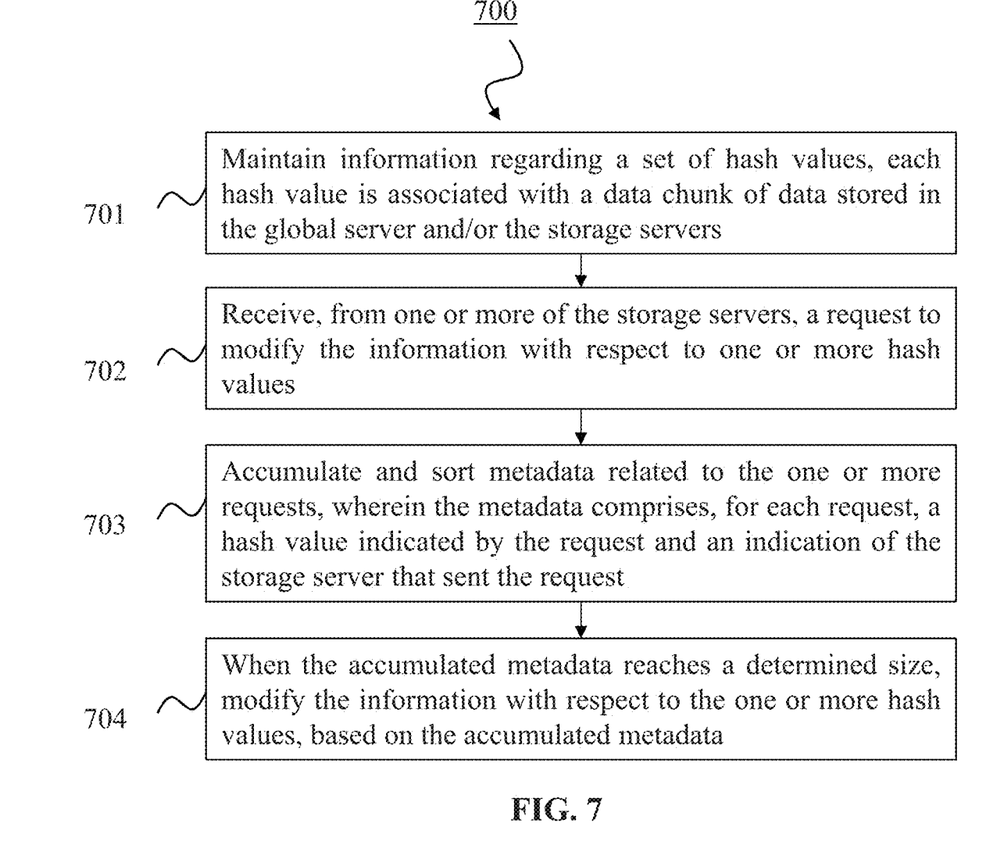
FIG. 7 shows a flowchart of a method according to an embodiment of the disclosure.

FIG. 7 shows a method 700 performed by a global server 100 for deduplicating multiple storage servers 110 according to an embodiment of the present disclosure. In particular, the global server 100 is the global server 100 of FIG. 1. The method 700 comprises: a step 701 of maintaining information 101 regarding a set of hash values, each hash value is associated with a data chunk of data in the global server 100 and/or the storage servers 110; a step 702 of receiving, from one or more of the storage servers 110, a request in to modify the information 101 with respect to one or more hash values; a step 703 of accumulating and sorting metadata 102 related to the one or more requests 111, wherein the metadata comprises, for each request, a hash value indicated by the request and an indication of the storage server 110 that sent the request; and a step 704 of modifying the information 101 with respect to the one or more hash values, based on the accumulated metadata 102, when the accumulated metadata 102 reaches a determined size. Particularly, the storage server 110 are the storage device 110 of FIG. 1. For the skilled person in the art, the step 701 may be optional in the implementation of the method 700 performed by the global server 100.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the global server 100 and the storage server 110 comprise the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the global server 100 and the storage server 110 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A global server, comprising:
   a memory;
   a disk storage; and
   a processor coupled to the memory and the disk storage and configured to:
   receive, from one or more storage servers, at least one request to modify information corresponding to one or more hash values in a set of hash values, wherein the set of hash values is maintained by the global server, each hash value in the set of hash values is associated with a respective data chunk of data stored in the global server or in multiple storage servers, and each respective data chunk of data that is stored in the global server or in the multiple storage servers and that is associated with the one or more hash values is not comprised in the at least one request, and the global server is separate from and coupled to the one or more storage servers;
   accumulate and store metadata related to the at least one request in the memory, wherein the metadata comprises, for each request, a hash value indicated by the respective request and an indication of the storage server that sent the respective request, and the metadata is stored independently of any data chunks corresponding to the at least one request;
   in response to the accumulated metadata reaching a threshold size, fill the metadata into a first block of a plurality of blocks, wherein each block of the plurality of blocks comprises a same number of chunks, and each chunk in each block of the plurality of blocks is filled with only metadata related to one or more requests;
   dump the first block to the disk storage; and
   in response to a number of blocks dumped to the disk storage exceeding a block threshold, modify information corresponding to hash values associated with the plurality of blocks, based on the accumulated metadata in the plurality of blocks.

2. The global server according to claim 1, wherein the information corresponding to the one or more hash values in the set of hash values comprises a hash metadata table including the set of hash values, the hash metadata table being stored in the disk storage.

3. The global server according to claim 2, wherein the processor is further configured to:
   divide the hash metadata table into N parts, N being a positive integer no less than 2, wherein each part of the N parts of the hash metadata table is associated with a different range of hash values of the set of hash values;
   upload a first part of the hash metadata table to the memory, wherein the first part of the hash metadata table is associated with a first range of hash values; and
   modify the first part of the hash metadata table based on the accumulated metadata in the plurality of blocks.

4. The global server according to claim 3, wherein the processor is further configured to:
   upload a first chunk of each block dumped to the disk storage to the memory;
   iterate over the hash values included in the metadata in all uploaded first chunks;
   merge the hash values that fall into the first range of hash values; and
   modify the first part of the hash metadata table stored in the memory, based on the metadata related to the merged hash values that fall into the first range of hash values.

5. The global server according to the claim 4, wherein the processor is further configured to:
   after merging the hash values included in metadata in a first chunk of a respective block, which fall into the first range of hash values, upload a second chunk, of that block, to the memory;
   iterate over the hash values included in the metadata in the uploaded second chunk;
   merge the hash values that fall into the first range of hash values; and
   modify the first part of the hash metadata table stored in the memory, based on the metadata related to the merged hash values that fall into the first range of hash values.

6. The global server according to the claim 4, wherein the processor is further configured to:
   in response to a hash value that does not fall into the first range of hash values being found in a chunk of a block, stop iterating over the hash values included in the metadata in that chunk.

7. The global server according to claim 4, wherein the processor is further configured to:
   after iterating over the hash values included in the metadata in all uploaded chunks of each block dumped to the disk storage, which fall into the first range of hash values, perform the following:
   persist the modified first part of the hash metadata table to the disk storage;
   upload a second part of the hash metadata table to the memory, wherein the second part of the hash metadata table is associated with a second range of hash values; and
   modify the second part of the hash metadata table based on the accumulated metadata in the plurality of blocks.

8. The global server according to claim 2, wherein:
the hash metadata table comprises information about each hash value in the set of hash values and, for each hash value, information regarding one or more storage servers being registered for that hash value.

9. The global server according to claim 5, wherein the processor is further configured to:
in response to metadata, which is related to a first hash value falling into the first range of hash values, comprising a request to add the first hash value, performing the following:
in response to the first hash value not being included in the first part of the hash metadata table, add the first hash value into the first part of the hash metadata table, create a first water mark associated with the first hash value, and register the storage server that sent the request to add the first hash value, wherein the first water mark indicates whether a data chunk having the first hash value is highly duplicated among the storage servers; or
in response to the first hash value being included in the first part of the hash metadata table, increase a value of a first water mark associated with the first hash value, and register the storage server that sent the request to add the first hash value; or
in response to metadata, which is related to a second hash value falling into the first range of hash values, comprising a request to delete the second hash value, decrease a value of a second water mark associated with the second hash value, and unregister the storage server that sent the request to delete the second hash value, wherein the second water mark indicates whether a data chunk having the second hash value is highly duplicated among the storage servers, and in response to the value of the second water mark being equal to 0, delete the second hash value from the first part of the hash metadata table.

10. A system, comprising:
a global server; and
multiple storage servers being configured to send requests to modify information corresponding to hash values of a set of hash values;
wherein the global server is separate from and coupled to the multiple storage servers, and the global server is configured to:
receive, from one or more of the multiple storage servers, one or more requests to modify information corresponding to one or more hash values from the set of hash values, wherein the set of hash values is maintained by the global server, each hash value of the set of hash values is associated with a respective data chunk of data stored in the global server or the multiple storage servers, and each respective data chunk of data that is stored in the global server or in the multiple storage servers and that is associated with the one or more hash values is not comprised in the one or more requests;
accumulate and store metadata related to the one or more requests in a memory of the global server, wherein the metadata comprises, for each request, a hash value indicated by the request and an indication of the storage server that sent the request, and the metadata is stored independently of any data chunks corresponding to the one or more requests;
in response to the accumulated metadata reaching a threshold size, fill the metadata into a first block of a plurality of blocks, wherein each block comprises a same number of chunks, and each chunk of each block of the plurality of blocks is filled with only metadata related to one or more requests;
dump the first block to a disk storage of the global server; and
in response to a number of blocks dumped to the disk storage exceeding a block threshold, modify the information corresponding to the one or more hash values, based on the accumulated metadata in the plurality of blocks.

11. The system according to claim 10, wherein the information corresponding to the one or more hash values in the set of hash values comprises a hash metadata table including the set of hash values, the hash metadata table being stored in the disk storage of the global server.

12. The system according to claim 11, wherein the global server is further configured to:
divide the hash metadata table into N parts, N being a positive integer no less than 2, wherein each part of the N parts of the hash metadata table is associated with a different range of hash values of the set of hash values;
upload a first part of the hash metadata table to the memory, wherein the first part of the hash metadata table is associated with a first range of hash values; and
modify the first part of the hash metadata table based on the accumulated metadata in the plurality of blocks.

13. The system according to claim 12, wherein the global server is further configured to:
upload a first chunk of each block dumped to the disk storage to the memory;
iterate over the hash values included in the metadata in all uploaded first chunks;
merge the hash values that fall into the first range of hash values; and
modify the first part of the hash metadata table stored in the memory, based on the metadata related to the merged hash values that fall into the first range of hash values.

14. The system according to the claim 13, wherein the global server is further configured to:
after merging the hash values included in metadata in a first chunk of a respective block, which fall into the first range of hash values, upload a second chunk, of that block, to the memory;
iterate over the hash values included in the metadata in the uploaded second chunk;
merge the hash values that fall into the first range of hash values; and
modify the first part of the hash metadata table stored in the memory, based on the metadata related to the merged hash values that fall into the first range of hash values.

15. The system according to the claim 13, wherein the global server is further configured to:
in response to a hash value that does not fall into the first range of hash values being found in a chunk of a block, stop iterating over the hash values included in the metadata in that chunk.

16. The system according to claim 13, wherein the global server is further configured to:
after iterating over the hash values included in the metadata in all uploaded chunks of each block dumped to the disk storage, which fall into the first range of hash values, perform the following:
persist the modified first part of the hash metadata table to the disk storage;

upload a second part of the hash metadata table to the memory, wherein the second part of the hash metadata table is associated with a second range of hash values; and modify the second part of the hash metadata table based on the accumulated metadata in the plurality of blocks.

17. A method, comprising:

receiving, from one or more storage servers, one or more requests to modify information corresponding to one or more hash values from a set of hash values, wherein the set of hash values is maintained by a global server, each hash value of the set of hash values is associated with a respective data chunk of data stored in the global server or in multiple storage servers, and each respective data chunk of data that is stored in the global server or in the multiple storage servers and that is associated with the one or more hash values is not comprised in the one or more requests, and the global server is separate from and coupled to the one or more storage servers;

accumulating and storing metadata related to the one or more requests in a memory of the global server until the accumulated metadata reaches a threshold size, wherein the metadata comprises, for each request, a hash value indicated by the request and an indication of a storage server that sent the request, and the metadata is stored independently of any data chunks corresponding to the one or more requests;

in response to the accumulated metadata reaching the threshold size, fill the metadata into a first block of a plurality of blocks, wherein each block comprises a same number of chunks, and each chunk of each block of the plurality of blocks is filled with only metadata related to one or more requests;

dump the first block to a disk storage of the global server;

continuing to dump blocks to the disk storage of the global server until a block threshold is exceeded; and in response to a number of blocks dumped to the disk storage exceeding the block threshold, modify the information corresponding to the one or more hash values, based on the accumulated metadata in the plurality of blocks.

18. The method according to claim 17, wherein the information corresponding to the one or more hash values in the set of hash values comprises a hash metadata table including the set of hash values, the hash metadata table being stored in the disk storage.

19. The method according to claim 18, further comprising:

dividing the hash metadata table into N parts, N being a positive integer no less than 2, wherein each part of the N parts of the hash metadata table is associated with a different range of hash values of the set of hash values;

uploading a first part of the hash metadata table to the memory, wherein the first part of the hash metadata table is associated with a first range of hash values; and modifying the first part of the hash metadata table based on the accumulated metadata in the plurality of blocks.

20. The method according to claim 19, further comprising:

uploading a first chunk of each block dumped to the disk storage to the memory;

iterating over the hash values included in the metadata in all uploaded first chunks;

merging the hash values that fall into the first range of hash values; and modifying the first part of the hash metadata table stored in the memory, based on the metadata related to the merged hash values that fall into the first range of hash values.

* * * * *